United States Patent [19]
Beal et al.

[11] Patent Number: 6,073,221
[45] Date of Patent: Jun. 6, 2000

[54] SYNCHRONIZATION OF SHARED DATA STORES THROUGH USE OF NON-EMPTY TRACK COPY PROCEDURE

[75] Inventors: David Grant Beal, Longmont; Michael Steven Milillo, Louisville; Christopher James West, Boulder, all of Colo.

[73] Assignee: International Business Machines Corporation, Armonk, N.Y.

[21] Appl. No.: 09/002,851

[22] Filed: Jan. 5, 1998

[51] Int. Cl.$^7$ ..................................................... G06F 12/06
[52] U.S. Cl. ........................................... 711/162; 707/204
[58] Field of Search ............................ 711/162; 707/204; 364/187

[56] References Cited

U.S. PATENT DOCUMENTS

| | | | |
|---|---|---|---|
| 4,521,871 | 6/1985 | Galdun et al. | 364/187 |
| 5,101,492 | 3/1992 | Schultz et al. | 714/57 |
| 5,155,845 | 10/1992 | Beal et al. | 714/6 |
| 5,239,637 | 8/1993 | Davis et al. | 711/765 |
| 5,274,807 | 12/1993 | Hoshen et al. | 707/205 |
| 5,504,861 | 4/1996 | Crockett et al. | 714/13 |
| 5,515,502 | 5/1996 | Wood | 707/204 |
| 5,615,329 | 3/1997 | Kern et al. | 714/6 |
| 5,742,792 | 4/1998 | Yanai et al. | 711/162 |
| 5,829,023 | 10/1998 | Bishop | 711/162 |
| 5,835,953 | 11/1998 | Ohran | 711/162 |
| 5,930,824 | 7/1999 | Anglin et al. | 711/162 |

*Primary Examiner*—Jack A. Lane
*Attorney, Agent, or Firm*—Ohlandt, Greeley, Ruggiero & Perle, L.L.P.

[57] ABSTRACT

Copies of data that are stored on tracks of a primary disk volume and a backup disk volume are synchronized by a method which reduces the amount of data that is transferred. The primary disk volume includes tracks with current data (i.e., non-empty tracks) and tracks with no current data (i.e., empty tracks). The method transfers to the backup disk volume only data from non-empty tracks on the primary disk volume and then writes the data onto tracks in the backup disk volume that correspond to the non-empty tracks of the primary disk volume. Prior to writing of the data onto the backup disk volume, it is preferred that the backup disk volume have all tracks erased so that after the write action, only the tracks with current data have data written therein. Further, at the primary disk volume, only tracks having current data are read. Accordingly, substantial savings in processing and data transfer times are achieved.

12 Claims, 2 Drawing Sheets

SYNCHRONIZATION OF SHARED DATA STORES THROUGH USE OF NON-EMPTY TRACK COPY PROCEDURE

FIELD OF THE INVENTION

This invention relates to systems wherein independent data storage devices maintain shared copies of data and, more particularly, to an improved system and method for synchronizing data storage devices which store shared data to assure that their data contents are completely consistent.

BACKGROUND OF THE ART

A typical digital computer system includes one or more disk subsystems for storing both data and instructions. Disks within the disk subsystems are divided into a plurality of tracks, at selected radial distances from the center and sectors which define particular angular regions across each track. When plural disks are present in a disk drive system, identically positioned tracks on each disk are handled as a volume (or cylinder).

Since stored data may be unintentionally corrupted or destroyed, systems have been developed that create multiple copies of stored data, usually on separate disk drives so that if the data on one of the devices or disks is damaged, it can be recovered from one or more of the remaining copies. The prior art refers to such provision of copies as either "shadowing" or "mirroring" of data.

While some systems create the shadow or mirrored copy at the end of a discrete period, many systems now back up their data on a continuing basis so as to maintain mirrored copies in "synchronism". Under certain circumstances, mirrored copies of data on two disk drives can become unsynchronized, e.g., where there is a failure in one disk drive, a data corruption during a read or write action, a data transmission problem, etc., etc.

The prior art has attempted to cope with failures in synchronization between data stored on mirrored or shadowed disk drive arrangements. U.S. Pat. No. 5,504,861 to Crockett et al., describes a remote data shadowing system wherein synchronization is accomplished by assuring that record updates are ordered so that the record updates at the shadowed disk are accomplished in an order that is consistent with the order of the record updates at the primary disk. The backup (shadow) site optimizes the record updates of each group of updates such that the record updates to a same target track are included in a single input/output chain.

U.S. Pat. No. 5,398,331 to Huang et al. describes a synchronization procedure for dual copy shared data which executes an error interrupt system when an out-of-synchronization condition is detected. Under such a circumstance, the primary disk storage subsystem continues to operate in a non-redundant mode until all outstanding requests have been completed. Thereafter, a quiescent state is entered and the entire shared storage contents are image-copied from one storage controller to a failed storage controller (wherein the non-synchronous circumstance was determined). Operations are then resumed and the duplexed controller is restarted in synchronism.

U.S. Pat. No. 5,155,845 to Beal et al. describes a mirroring arrangement that is indicated to be an improvement over the Crockett et al. U.S. Pat. No. 5,504,861 discussed above. In the Beal et al. system, a failure of a single system element, such as a disk controller common to a plurality of disk drives, does not prevent the host processor from accessing a duplicate copy of a record on a disk drive of a second controller. More specifically, in Beal et al., the host processor transmits a read request to a first disk controller which passes the request, via a direct data link, to a second disk controller whose disk drive executes the request, reads a duplicate copy of the record and transmits the record contents over the data link to the first disk controller and, in turn, to the requesting host processor.

U.S. Pat. No. 5,23,637 to Davis et al.; U.S. Pat. No. 5,615,329 to Kearn et al.; and U.S. Pat. No. 5,101,492 to Schultz et al. each describe methods for assuring continued synchronism between primary and backup copies of mirrored data.

During any synchronization of disk drives which include shared data, substantial time is consumed in transferring data from the primary disk drive to the backup disk drive or vice versa. In fact, when synchronizing a pair of disk drives which maintain mirrored data, all tracks (and volumes) are generally transferred, thereby utilizing substantial processing and communication resources to accomplish the transference of the mirrored data.

It is an object of this invention to provide an improved method and apparatus for synchronization of disk drives which contain mirrored data.

It is a further object of this invention to reduce the amount of time required when implementing a mirrored data resynchronization action.

SUMMARY OF THE INVENTION

Copies of data that are stored on tracks of a primary disk drive and a backup disk drive are synchronized by a method which reduces the amount of data that is transferred. The primary disk drive includes tracks with current data (i.e., non-empty tracks) and tracks with no current data (i.e., empty tracks). The method transfers to the backup disk drive only data from non-empty tracks on the primary disk drive and then writes the data onto tracks in the backup disk drive that correspond to the non-empty tracks on the primary disk drive. Prior to writing of the data onto the backup disk drive, it is preferred that the backup disk drive have all tracks erased so that after the write action, only the tracks with current data have data written therein. Further, at the primary disk drive, only tracks having current data are read. Accordingly, substantial savings in processing and data transfer times are achieved.

DETAILED DESCRIPTION OF THE INVENTION

Figure 1:
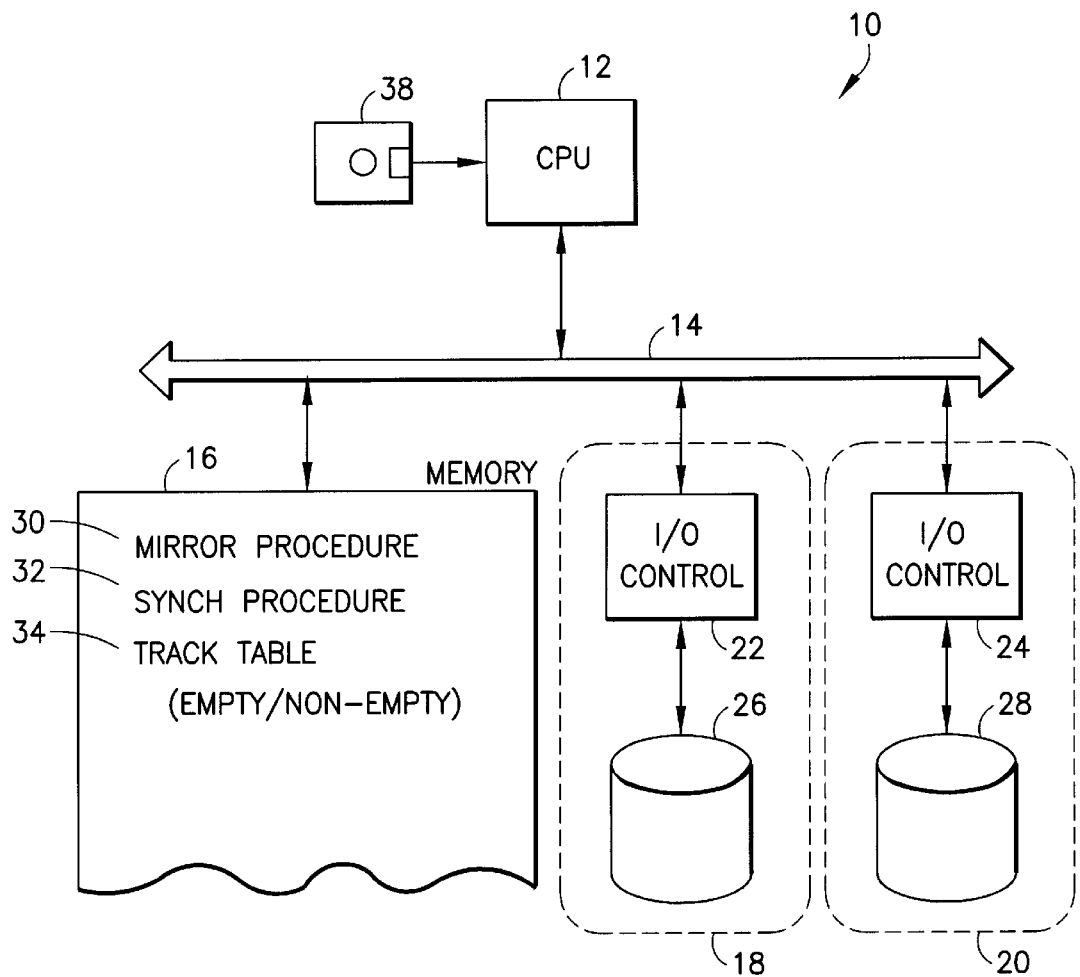
FIG. 1 is a high level block diagram illustrating a system that is adapted to carry out the invention.

Referring to FIG. 1, a computer system 10 includes a central processing unit (CPU) 12, a bus system 14, a memory 16 and at least two disk drive subsystems 18 and 20. Each disk drive subsystem 18 and 20 includes an input/output control module 22, 24 and disk drive 26, 28 respectively. Note that while each of disk drive subsystems 18 and 20 is shown as coupled to bus system 14, at least one of the disk drive subsystems may be located elsewhere, under control of an entirely separate CPU. In either event, computer 10 implements a mirroring procedure 30 (as stored in memory 16) which causes data that is written to one disk drive to be similarly written to another disk drive, so that two copies thereof exist in disk memory. As is known in the prior art, such a mirroring procedure enables recovery in the event of failure of one of the disk drives or occurrence of another malfunction.

When appropriate, the mirrored data in disk drive subsystems 18 and 20 are synchronized to assure that completely identical data exists in both subsystems. A synchronization procedure 32 is resident in memory 16 and, in concert with CPU 12, performs the synchronization actions necessary to assure complete identity of data in both disk drive subsystems 18 and 20. Also contained in memory 16 is a track table 34 which includes information which identifies each track in disk drive 26 that includes current data and each track which includes no current data or is, in other words, empty.

Hereafter, any track which includes current data will be referred to as a non-empty track and any track which includes no current data will be referred to as an empty track. Disk drive 26 will be referred to as the primary disk drive and disk drive 28 will be referred to as the backup disk drive. Further, while it is to be understood that the preferred addressable unit is a volume that may be contained on one or more disk drives, it will be assumed for the following description that an addressed volume is resident on only one disk drive.

Track table 26 is maintained current by CPU 12 noting in it, at each write action, which track is written to. In such case, a flag is set indicating that the track incorporates current data. As will be hereafter understood, synchronization procedure 16 is only concerned with non-empty tracks and, during a synchronization action, transfers no data from empty tracks. Thus, any procedure which keeps a record of tracks with current data and by implication, tracks that are empty, is within the scope of this invention.

While each of the procedures shown in memory 16 is indicated as already loaded thereinto, such procedures may be contained on a disk cartridge, a compact disk or other memory media 38 that can be read by CPU 12. Under such circumstances, CPU 12 is controlled by the data read from storage device 38 to perform the method and operation of the invention.

Figure 2:
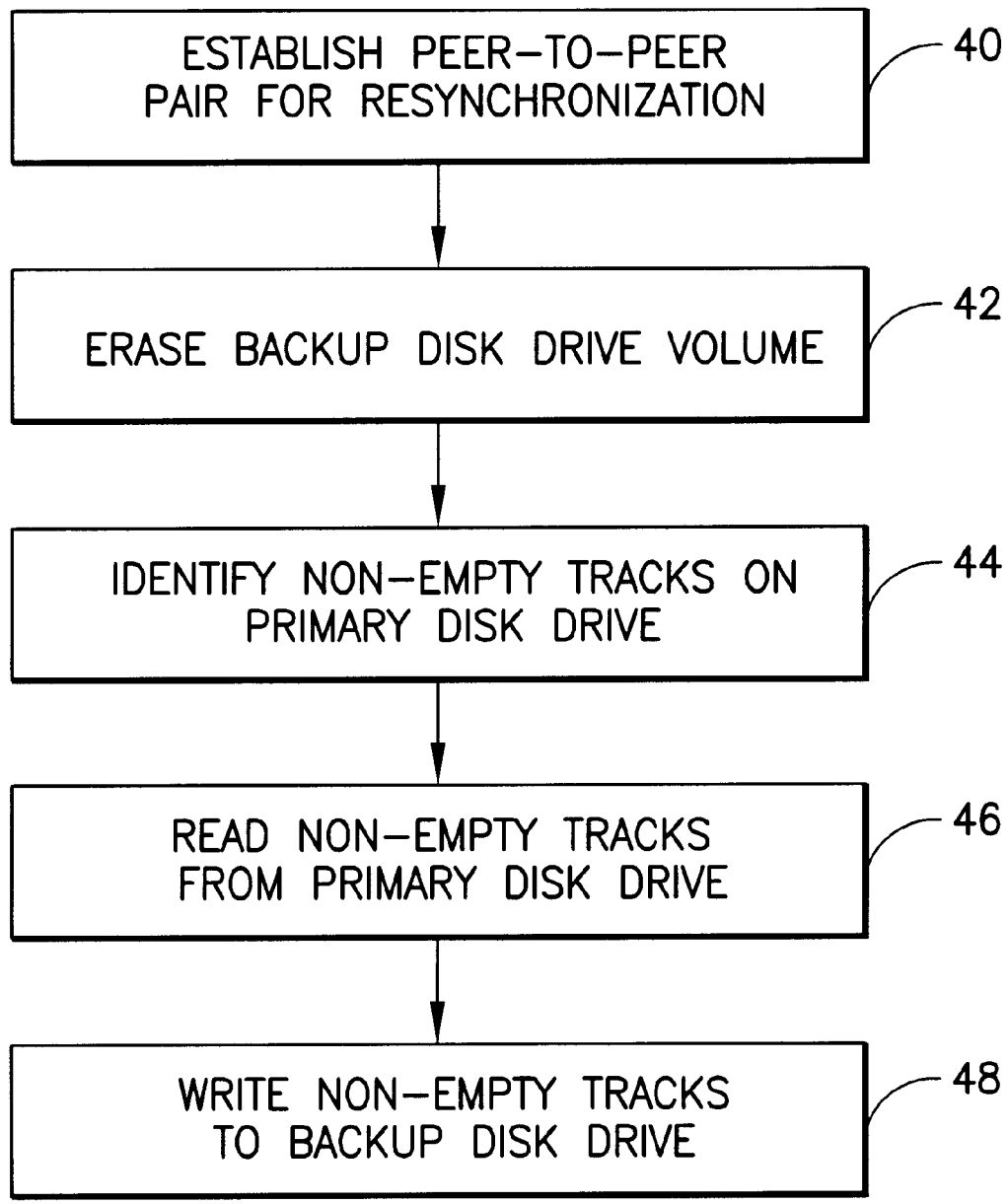
FIG. 2 is a logic flow diagram illustrating the method of the invention.

Turning to FIG. 2, synchronization procedure 32 operates to control CPU 12 in the following manner. Initially, synchronization procedure 32 is activated upon a finding that synchronization has been lost between data stored in the volumes of primary disk drive 26 and backup disk drive 28; or, upon a power-up of the system where a synchronization action is required to assure complete identity of data before further operations are commenced.

Accordingly, synchronization procedure 32 initially establishes a peer-to-peer disk drive volume pair for synchronization (box 40). Thereafter, CPU 12 issues a command to backup disk drive 28 to erase its volume, which action is executed by I/O control module 24 in concert with backup disk drive 28 (box 42).

Thereafter, synchronization procedure 32 utilizes information in track table 34 to identify each track on primary disk drive 26 which is non-empty (box 44). Then, synchronization procedure 32, in concert with CPU 12, causes each non-empty track to be read from primary disk drive 26 (box 46). The non-empty track data is then transferred to I/O control module 24 and is written to backup disk drive 28 onto tracks which correspond in position to the tracks initially read from primary disk drive 26 (box 48). At this point, both primary disk drive 26 and backup disk drive 28 are synchronized and further data processing actions can take place. As only data from non-empty tracks are transferred, transfer of header and other data from empty tracks is avoided and data transmission times are reduced.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for synchronizing copies of data that are stored on tracks of a primary disk volume and a backup disk volume, wherein said primary disk volume includes non-empty tracks with current data and empty tracks with no current data, said method comprising the steps of:

a) transferring only data from said non-empty tracks on said primary disk volume to said backup disk volume; and b) writing said data from said non-empty tracks onto tracks in said backup disk volume that correspond to said non-empty tracks on said primary disk volume, whereby empty tracks on said backup disk volume correspond to said empty tracks on said primary disk volume.

2. The method as recited in claim 1, including the additional step of;

c) causing erasure of all empty tracks and non-empty tracks on said backup disk volume before execution of step b).

3. The method as recited in claim 1, wherein step a) includes the substep of:

a1) maintaining a record for said primary disk volume from which information can be derived as to which tracks are empty and which tracks are non-empty, and employing said information to control which data are transferred.

4. The method as recited in claim 3, wherein step a) includes the further substep of:

a2) under control of said information, reading data from only non-empty tracks on said primary disk volume to enable said transfer.

5. A memory media including a procedure for controlling a processor to synchronize copies of data that are stored on tracks of a primary disk volume and a backup disk volume, wherein said primary disk volume includes non-empty tracks with current data and empty tracks with no current data, said memory media comprising:

a) means for controlling said processor to transfer only data from said non-empty tracks on said primary disk volume to said backup disk volume; and b) means for controlling said processor to issue commands that cause a writing of said data from said non-empty tracks onto tracks in said backup disk volume that correspond to said non-empty tracks on said primary disk volume.

6. The memory media as recited in claim 5, further comprising;

c) means for controlling said processor to cause erasure of all empty tracks and non-empty tracks on said backup disk volume before operation of means b).

7. The memory media as recited in claim 5, wherein means a) further controls said processor to maintain a record for said primary disk volume from which information can be derived as to which tracks are empty and which tracks are non-empty, and to employ said information to control which data are transferred.

8. The memory media as recited in claim 7, wherein means a), under control of said information, further controls said processor to read data only from non-empty tracks on said primary disk volume to enable said transfer.

9. A system for synchronizing copies of data that are stored on tracks of a primary disk volume and a backup disk volume, wherein said primary disk volume includes non-empty tracks with current data and empty tracks with no current data, said system comprising the steps of:

a) processor means for transferring only data from said non-empty tracks on said primary disk volume to said backup disk volume; and b) input/output control means responsive to receipt of data from said non-empty tracks, for writing said data from said non-empty tracks onto tracks in said backup disk volume that correspond to said non-empty tracks on said primary disk volume.

10. The system as recited in claim 9, wherein said processor means causes erasure of all empty tracks and non-empty tracks on said backup disk volume before operation of said input/output control means b).

11. The system as recited in claim 9, wherein said processor means maintains a record for said primary disk volume from which information can be derived as to which tracks are empty and which tracks are non-empty and employs said information to control which data are transferred.

12. The system as recited in claim 11, wherein said processor means, under control of said information, causes data to be read from only non-empty tracks on said primary disk volume to enable said transfer.

* * * * *